United States Patent
Leroux et al.

(10) Patent No.: US 12,189,835 B2
(45) Date of Patent: Jan. 7, 2025

(54) METHOD FOR CONTROLLING A VIRTUALIZED REALITY SYSTEM, AND SYSTEM FOR IMPLEMENTING THE METHOD

(71) Applicant: ORANGE, Issy-les-Moulineaux (FR)

(72) Inventors: Sylvain Leroux, Chatillon (FR); Thierry Gaillet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 763 days.

(21) Appl. No.: 17/419,054

(22) PCT Filed: Dec. 9, 2019

(86) PCT No.: PCT/FR2019/052968
§ 371 (c)(1),
(2) Date: Jun. 28, 2021

(87) PCT Pub. No.: WO2020/136316
PCT Pub. Date: Jul. 2, 2020

(65) Prior Publication Data
US 2022/0075445 A1    Mar. 10, 2022

(30) Foreign Application Priority Data
Dec. 28, 2018    (FR) .................................... 1874311

(51) Int. Cl.
*G06F 3/01*    (2006.01)
*G06F 3/03*    (2006.01)
(Continued)

(52) U.S. Cl.
CPC ............ *G06F 3/011* (2013.01); *G06F 3/0304* (2013.01); *G08B 21/00* (2013.01); *H04W 4/38* (2018.02)

(58) Field of Classification Search
CPC ....... G06F 3/011; G06F 3/0304; G08B 21/00; H04W 4/38
See application file for complete search history.

(56) References Cited

U.S. PATENT DOCUMENTS

2015/0092015 A1* 4/2015 Stafford .................. G06F 3/017
                                                                                 348/46
2018/0373412 A1* 12/2018 Reif ..................... G06F 3/04815
2019/0179016 A1* 6/2019 Raring .................. H01S 5/0085

FOREIGN PATENT DOCUMENTS

WO      2018106735 A1    6/2018

OTHER PUBLICATIONS

English translation of the Written Opinion of the International Searching Authority dated May 8, 2020 for corresponding International Application No. PCT/FR2019/052968, filed Dec. 9, 2019.
(Continued)

*Primary Examiner* — Bobbak Safaipour
(74) *Attorney, Agent, or Firm* — David D. Brush; Westman, Champlin & Koehler, P.A.

(57) ABSTRACT

A method for controlling a warning system including a user device. The method includes, in the warning system: receiving a wireless signal transmitted towards a surface on which a user is located, of which the range defines, on the surface, a plurality of zones including a no-warning first zone and a warning second zone, a characteristic relating to the transmitted signal being able to take a second value corresponding to the second zone; upon detecting the characteristic having the second value, generating a warning signal, and transmitting the warning signal to a control unit of the warning system in order to notify a user of the system.

21 Claims, 9 Drawing Sheets

(51) Int. Cl.
*G08B 21/00* (2006.01)
*H04W 4/38* (2018.01)

(56) References Cited

OTHER PUBLICATIONS

International Search Report dated Apr. 27, 2020 for corresponding International Application No. PCT/FR2019/052968, Dec. 9, 2019.
Written Opinion of the International Searching Authority dated Apr. 27, 2020 for corresponding International Application No. PCT/FR2019/052968, filed Dec. 9, 2019.
Petros Spachos et al., "Microlocation for Smart Buildings in the Era of the Internet of Things: A Survey of Technologies, Techniques, and Approaches" IEEE Signal Processing Magazine., US, vol. 35, No. 5, Aug. 28, 2018 (Aug. 28, 2018), pp. 140-152, DOI: 10.1109/MSP.2018.2846804, XP055630426.

* cited by examiner

METHOD FOR CONTROLLING A VIRTUALIZED REALITY SYSTEM, AND SYSTEM FOR IMPLEMENTING THE METHOD

CROSS-REFERENCE TO RELATED APPLICATIONS

This Application is a Section 371 National Stage Application of International Application No. PCT/FR2019/052968, filed Dec. 9, 2019 and published as WO 2020/136316 on Jul. 2, 2020, which claims priority benefit under 35 U.S.C. § 119 from French Patent Application No. FR1874311, filed Dec. 28, 2018, the disclosures of which are incorporated by reference herein in their entireties.

FIELD

The present disclosure relates to a method for controlling a virtualized reality system comprising a virtualized reality device, as well as to a device and a system for implementing this method. It applies in particular to portable virtual reality devices, such as headsets, or to augmented reality devices, such as augmented reality glasses.

BACKGROUND

Growth in the use of virtual reality is still very modest, limited to a few niches such as gaming or training, and this is due to many impediments and obstacles.

As examples, we can cite the impression of immersion, which is limited by current physical constraints linked to the use of cables that hinder people's mobility and the fluidity of their movements, the lack of responsiveness and of fluidity of the content that is broadcast due to insufficient throughput, the problem of adapting to small spaces, which can result in hazards for individuals (impacts, falls, etc.) and damage to their environment (furniture, rugs, etc.), the difficulty multi-user/multi-player experiences because they collide and hinder each other, problems with stress, tension, and potentially nausea of users, ignorance of potential changes in the environment since the virtual reality experience began (new onlookers, unwanted entry, departure, warning sound, etc.) and the absence of notification or graduation in the environmental feedback: new user, furniture, unwanted entry, at the cable's limit, etc.

In a work context, there are additional constraints related to standards of safety, isolation, fire alarm, etc.

Certain known solutions, such as the specific installation of cages, the reservation of a dedicated room, the presence of an assistant/monitor, the placement of markers on the ground with mats and contours (similar to rough strips or bumps for the blind) are particularly expensive and not very versatile. Users unable to use them are then forced to self-restrict their virtual reality experience, in particular by reducing the space dedicated to this experience, which leads to frustration.

An object of the present disclosure is to at least partially remedy the above disadvantages.

SUMMARY

According to a first aspect, a method is proposed for controlling a warning system comprising a user device, the method comprising, in the warning system: receiving a wireless signal transmitted towards a surface on which a user is located, of which the range defines, on the surface, a plurality of zones comprising a no-warning first zone and a warning second zone, a characteristic relating to the transmitted signal being able to take a first value corresponding to the first zone or to the second zone; upon detection of the characteristic having the first value when the first value corresponds to the second zone, or upon non-detection of the characteristic having the first value when the first value corresponds to the first zone, obtaining a warning signal, and transmitting the warning signal to a control unit of the warning system in order to notify a user of the system.

The proposed method advantageously makes it possible to define, on a surface on which the user of a virtualized reality device (virtual reality, augmented reality, or mixed reality device) is moving, several zones, among which there is at least one no-warning zone and at least one warning zone, so that the user can receive appropriate notifications based on his movements and displacements and on changes in his environment.

The proposed method is advantageously applicable to virtual reality systems and devices, to augmented reality systems and devices, or to so-called "mixed reality" systems and devices, meaning virtual reality systems and devices enhanced with augmented reality systems or devices. In the case of augmented reality systems and devices, the proposed method advantageously makes it possible to protect the user from the part of his actual environment that he does not perceive (for example obstacles located behind his back when he is moving). The proposed method is also applicable to a system and a device for assisting the visually impaired, the device being intended to be worn by the visually impaired person. In the following, a warning system may be a virtualized reality system or a virtual reality system, and the terms are used interchangeably. Similarly, in the following, a user device may be a virtual reality device, and the terms are interchangeable.

The features set forth in the following paragraphs may optionally be implemented. They may be implemented independently of each other or in combination with each other:

In one or more embodiments, the characteristic relating to the transmitted signal can also take a second value, the second value corresponding to the first zone when the first value corresponds to the second zone, or to the second zone when the first value corresponds to the first zone.

In one or more embodiments, the transmitted signal comprises a light beam of which the aperture is modulated over time, the first value and the second value respectively corresponding to at least one first value and at least one second value for the aperture of the light beam.

In one or more embodiments, the light beam transmits an optical data transmission signal, for example of the LiFi type.

In one or more embodiments, the proposed method further comprises: generating the warning signal upon detection of the reception of the transmitted signal with the characteristic having the value corresponding to the second zone.

In one or more embodiments, the proposed method further comprises: upon detection of the reception of the transmitted signal with the characteristic having the value corresponding to the second zone, transmitting a detection signal to a system management platform, and receiving the warning signal.

In one or more embodiments, the proposed method further comprises: upon reception of the transmitted signal with the characteristic having the value corresponding to the first zone, obtaining a no-warning signal.

In one or more embodiments, the proposed method further comprises: on a user interface of the user device of the warning system, generating a user notification on the basis of the warning signal.

In one or more embodiments, the proposed method further comprises: receiving a message of unwanted entry into one of the plurality of zones, and generating a user notification on the basis of the message of unwanted entry.

In one or more embodiments, the proposed method further comprises: configuring the system by learning the zones of the plurality of zones.

In one or more embodiments, the proposed method further comprises: notifying the user of the warning signal from the system, by modifying a virtualized reality content presented to the user.

According to another aspect, a method is proposed for controlling a warning system comprising a user device, the method comprising, in the warning system: receiving a wireless signal, transmitted towards a surface on which a user is located, of which the range defines a plurality of zones on the surface comprising a no-warning first zone and a warning second zone, a characteristic relating to the transmitted signal being able to take a second value corresponding to the second zone; upon detection of the characteristic having the second value, obtaining a warning signal, and transmitting the warning signal to a control unit of the warning system in order to notify a user of the system. In one or more embodiments, the characteristic relating to the transmitted signal may also take a first value corresponding to the first zone. In one or more embodiments, the transmitted signal comprises a light beam of which the aperture is modulated over time, the first value and the second value respectively corresponding to a first value and a second value of the aperture of the light beam. In one or more embodiments, the light beam transmits an optical data transmission signal, for example of the LiFi type. In one or more embodiments, the proposed method further comprises: generating the warning signal upon detection of the reception of the transmitted signal with the characteristic having the second value. In one or more embodiments, the proposed method further comprises: upon detection of the reception of the transmitted signal with the characteristic having the second value, transmitting a detection signal to a system management platform, and receiving the warning signal. In one or more embodiments, the proposed method further comprises: upon reception of the transmitted signal with the characteristic having the first value, obtaining a no-warning signal.

According to another aspect, a warning system is proposed comprising a user device comprising a processor and a wireless communication receiver that is operatively coupled to the processor, the device being configured to implement a method according to one of the embodiments proposed in this application.

Another aspect relates to a computer program, loadable into a memory associated with a processor, and comprising portions of code for implementing a method as proposed in this application, when said program is executed by the processor.

Another aspect relates to a set of data representing, for example by way of compression or encoding, a computer program as proposed in this application.

Another aspect relates to a non-transitory storage medium for a computer-executable program, comprising a set of data representing one or more programs, said one or more programs comprising instructions which, when said one or more programs is executed by a computer comprising a processor operatively coupled to a memory and to a data communication input/output interface, cause the computer to manage a warning system according to a method for controlling a warning system according to one of the embodiments proposed in this application.

BRIEF DESCRIPTION OF THE DRAWINGS

Other features and advantages of the present disclosure will be apparent from the following description of some non-limiting embodiments, with reference to the accompanying drawings, in which.

DETAILED DESCRIPTION

Figure 1A:
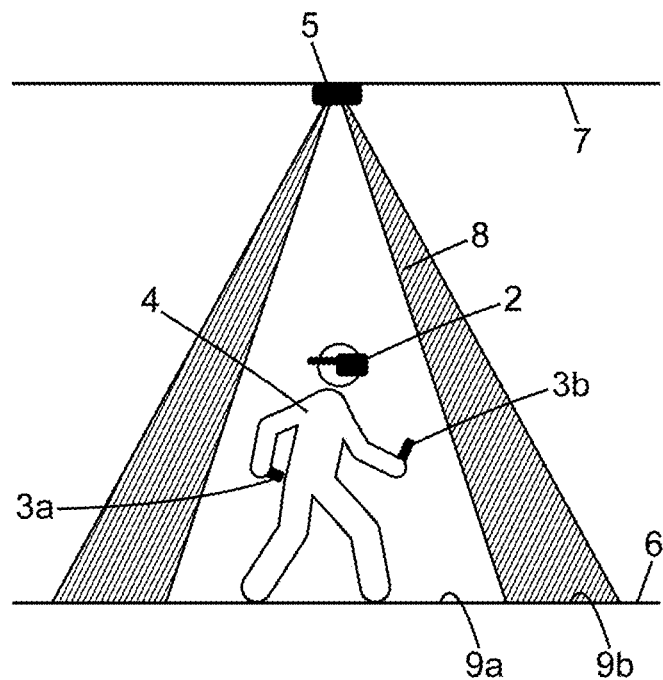
FIG. 1a shows a virtual reality system according to one or more embodiments.

In the following detailed description of some embodiments of the present disclosure, many specific details are presented in order to provide a more complete understanding. Nevertheless, a person skilled in the art can understand that some embodiments can be implemented without these specific details. In other cases, well-known characteristics are not described in detail, to avoid unnecessarily complicating this description.

This application refers to functions, motors, units, modules, platforms, and diagram illustrations of methods and devices according to one or more embodiments. Each of the functions, motors, modules, platforms, units, and diagrams described may be implemented as hardware, software (including the embedded form of software ("firmware"), or "middleware"), microcode, or any combination thereof. In the case of implementation in software form, the functions, motors, units, modules, and/or diagram illustrations may be implemented by computer program instructions or software code, which may be stored or transmitted on a computer-readable medium, including a non-transitory medium, or a medium loaded in memory of a specific, generic computer, or of any other programmable data processing apparatus or device for producing a machine, such that the computer program instructions or the software code executed on the computer or programmable data processing apparatus or device constitute means of implementing these functions.

Embodiments of a computer-readable medium include, but are not limited to, computer storage media and communication media, including any medium facilitating the transfer of a computer program from one location to another. "Computer storage medium/media" is understood to mean any physical medium that can be accessed by a computer. Examples of computer storage media include, but are not limited to, flash memory drives or components or any other flash memory devices (for example USB keys, memory keys, memory sticks, key drives), CD-ROMs or other optical data storage devices, DVDs, magnetic disk data storage devices or other magnetic data storage devices, data memory components, RAMs, ROMs, EEPROMs, memory cards ("smart cards"), memories of the SSD type ("Solid State Drive"), and any other form of medium which can be used to transport or store or save data or data structures which can be read by a computer processor.

In addition, various forms of computer-readable media can transmit or carry instructions to a computer such as a router, gateway, server, or any data transmission device, whether this involves wired transmission (by coaxial cable, optical fiber, telephone wires, DSL cable, or Ethernet cable), wireless transmission (by infrared, radio, cellular, microwave), or virtualized transmission devices (virtual router, virtual gateway, end of virtual tunnel, virtual firewall). The instructions may, depending on the embodiments, include code of any computer programming language or computer program element, such as, but without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "for example", "example", "typically" are used in this description to denote examples or illustrations of non-limiting embodiments, which do not necessarily correspond to embodiments that are preferred or advantageous in comparison to other possible aspects or embodiments.

"Server" or "platform" in this application is understood to mean any point of service (virtualized or not) or device performing data processing, one or more databases, and/or data communication functions. For example, and without limitation, the term "server" or the term "platform" may refer to a physical processor operatively coupled with associated communication functions, database functions, and data storage functions, or may refer to a network, group, assembly, or complex of processors and associated data storage and networking devices, as well as an operating system and one or more database system(s) and application software in support of the services and functions provided by the server. A computing device can be configured for sending and receiving signals, by wireless and/or wired transmission network(s), or can be configured for the processing and/or storage of data or signals, and can therefore operate as a server. Thus, devices configured to operate as a server may include, as non-limiting examples, dedicated rack-mounted servers, desktops, laptops, service gateways (sometimes referred to as "boxes" or "residential gateways"), multimedia decoders (sometimes called "set-top boxes"), integrated devices combining various functionalities, such as two or more of the functionalities mentioned above. Servers can vary widely in their configuration or their capabilities, but a server will typically include one or more central processing unit(s) and a memory. A server may also include one or more mass storage device(s), one or more power supply/supplies, one or more wireless and/or wired network interface(s), one or more input/output interface(s), one or more operating system(s), such as Windows Server, Mac OS X, Unix, Linux, FreeBSD, or an equivalent.

The terms "network" and "communication network" as used in this application refer to one or more data links which can couple or connect devices, possibly virtualized, so as to allow the transport of electronic data between computer systems and/or modules and/or other electronic devices or equipment, such as between a server and a client device or other types of devices, including between wireless devices coupled or connected by a wireless network, for example. A network can also include mass storage for storing data, such as a NAS ("Network Attached Storage", a SAN ("Storage Area Network"), or any other form of media readable by a computer or by a machine, for example. A network may comprise, wholly or in part, the Internet, one or more local area networks (LANs), one or more wide area networks (WANs), wired connections, wireless connections, cellular connections, or any combination of these different networks. Similarly, subnetworks may use different architectures or be compliant or compatible with different protocols, and interoperate with larger networks. Different types of devices can be used to provide interoperability between different architectures or protocols. For example, a router can be used to provide a communication link or a data link between two LANs that would otherwise be separate and independent.

The terms "operatively coupled", "coupled", "mounted", "connected", and their various variations and forms used herein refer to couplings, connections, mountings, which may be direct or indirect, and comprise in particular connections between electronic devices or between portions of such devices which enable operations and functions as described in this application. In addition, the terms "connected" and "coupled" are not limited to physical or mechanical connections or couplings. For example, an operative coupling may include one or more wired connection(s) and/or one or more wireless connection(s) between two or more devices that enable simplex and/or duplex communication links between the devices or portions of the devices. According to another example, an operative coupling or connection may include a coupling by wired and/or wireless link to enable data communications between a server of the proposed system and another device of the system.

The term "virtualized reality" as used in this application refers to all virtual reality technologies (or "VR"), to all augmented reality technologies (or "AR"), and to all technologies combining virtual reality technologies and augmented reality technologies (sometimes referred to as "mixed reality"). Virtual reality technologies are computer technologies that simulate the presence of a user in a virtual environment, for example created by one or more data streams generated by a computer system and transmitted to one or more virtual reality devices used by the user (for example a virtual reality headset, virtual reality controller(s)), and in particular include immersive multimedia technologies and computer-simulated reality technologies. Augmented reality technologies are technologies which add, to a user's experience, a processing of his actual environment, for example by superimposing, on the user's actual environment, virtual elements (sounds, images, videos, etc.)

generated by a computer system. Mixed reality technologies combine virtual reality technologies and augmented reality technologies to enhance the user experience, for example by overlaying a virtual environment generated by a computer system with elements corresponding to the user's actual environment.

Thus, although the exemplary embodiments described below relate to virtual reality technologies, those skilled in the art can understand that the methods, devices, and systems proposed in this application are not limited to virtual reality technologies, and that these can be implemented on devices and/or systems using virtual reality technologies just as well as on devices and/or systems using augmented reality technologies or on devices and/or systems using mixed reality technologies. The systems, devices, and methods proposed in this application are applicable to any virtual reality system or device, to any augmented reality system or device, and to any mixed reality system or device.

FIG. 1a illustrates an example of a virtual reality system (1) according to one or more embodiments.

The virtual reality system (1) comprises a first virtual reality device (2), arranged as a virtual reality headset worn by a user (4), second and third virtual reality devices (3a, 3b), which in the illustrated example are controllers held in the hand by the user (4). The virtual reality system further comprises a zone management unit (5), in this example attached to the ceiling (7) above the user (4).

The zone management unit (5) is configured to transmit, towards the surface of the floor (6) on which the user (4) is located, a signal (8) whose range defines at least two zones on the surface on which the user (4) is located, including a no-warning first zone (9a) and a warning second zone (9b). The signal defines a contour line on the surface (6), which can be of different shapes depending on the embodiment, for example such as a circular shape as illustrated in FIG. 1b.

Figure 1B:
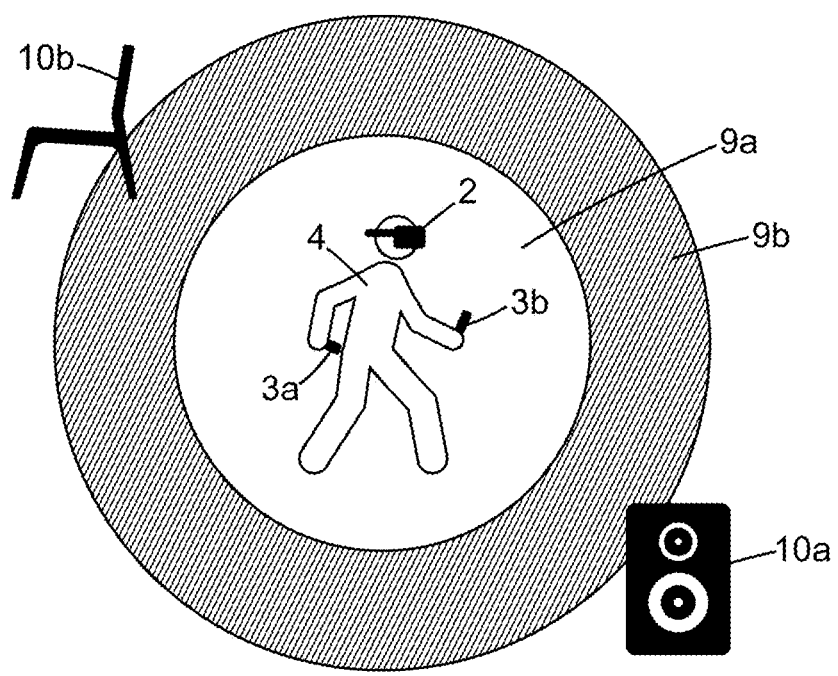
FIG. 1b shows a virtual reality system according to one or more embodiments.

Referring to FIG. 1b, the user is in a no-warning zone (9a) substantially having the shape of a disk. The no-warning zone (9a) is surrounded by a warning zone (9b), substantially in the shape of a ring surrounding the no-warning zone (9a) and in contact with it on the latter's inner periphery. Thus, in the example illustrated, the outer contour line of the no-warning zone (9a) has a substantially circular shape, as does the outer contour line of the warning zone (9b), the two contour lines being concentric, and the outer contour line of the no-warning zone (9a) corresponds to the inner contour line of the warning zone (9b), such that the two zones are in contact along one of their respective contour lines. As illustrated in the figure, the system (1) may preferably be configured so that the warning zone contains, wholly or in part, objects (10a, 10b) which the user could fall over or bump against. The warning zone (9b) thus corresponds to a zone in which the user will be notified that his safety may be compromised while he is in this zone.

In one or more embodiments, the zones (9a, 9b) may be configured so that each one corresponds to a notification sent to the user (4).

Figure 1C:
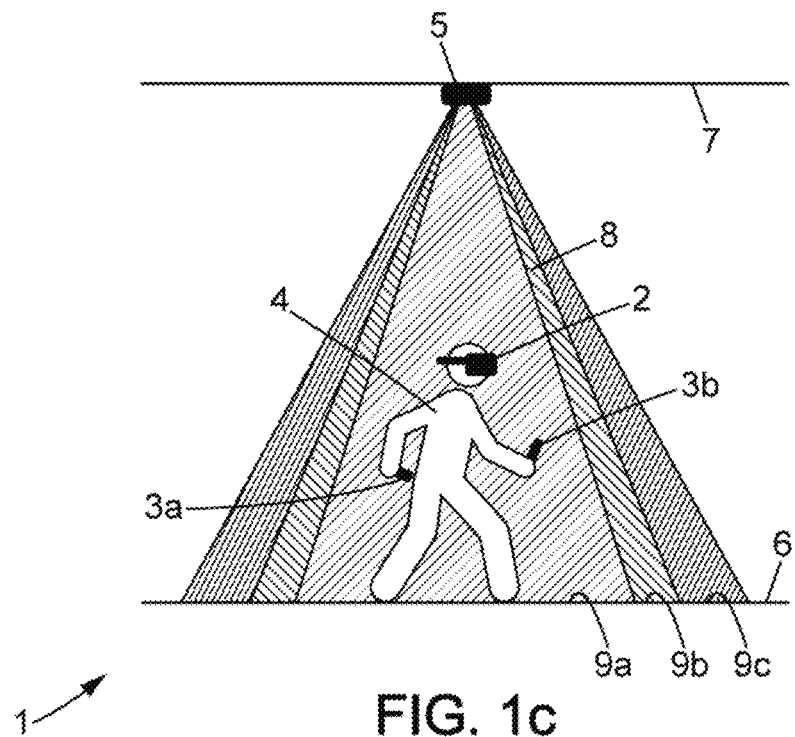
FIG. 1c shows a virtual reality system according to one or more embodiments.
Figure 1D:
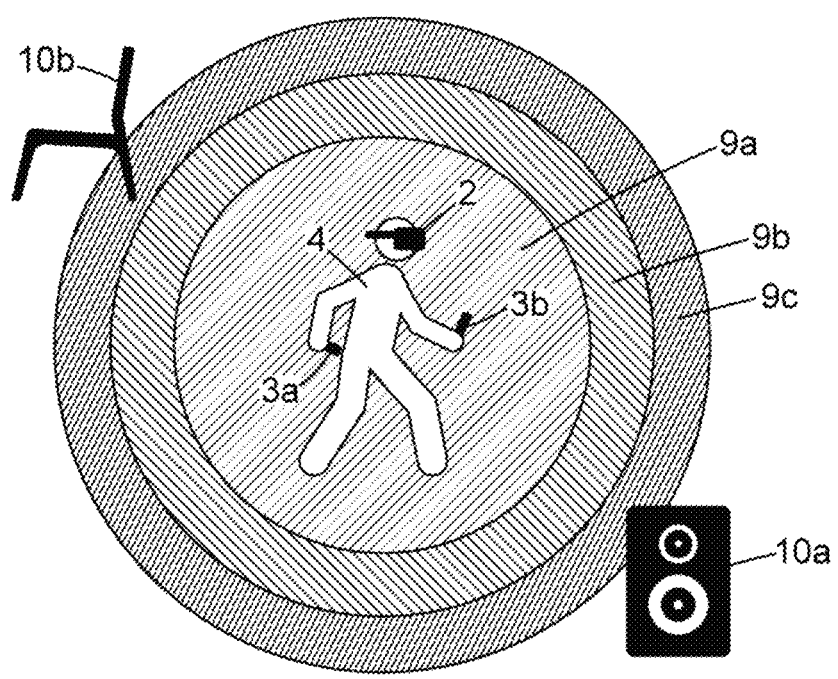
FIG. 1d shows a virtual reality system according to one or more embodiments.

FIGS. 1c and 1d illustrate exemplary embodiments in which three zones are defined: The zone management unit (5) can be configured to transmit a signal (8) to the surface of the floor (6) on which the user (4) is located, the range of this signal defining three zones on the surface on which the user (4) is located: a first no-warning zone (9a), a second warning zone (9b) (less serious warning), and a third warning zone (9c) (more serious warning). Referring to FIG. 1c, the user is located in a no-warning zone (9a) substantially in the shape of a disk. The no-warning zone (9a) is surrounded by two warning zones (9b, 9c): a first warning zone (9b) having substantially the shape of a ring surrounding the no-warning zone (9a) and in contact therewith along its inner periphery, and a second warning zone (9c) having substantially the shape of a ring surrounding the first warning zone (9b) and in contact therewith along its inner periphery.

As illustrated in FIG. 1d, the no-warning zone (9a) and the two warning zones (9b, 9c) are configured to take into account the environment around the user, for example such as the objects located in the space in which the user is located (4).

Referring to FIGS. 1a to 1d, the zone management unit (5) may be configured to transmit the signal (8) to the surface (6) of the floor so that only the warning zone, or where appropriate zones (9b, 9c), are within the range of the signal (8). In other words, in one or more embodiments the signal (8) can be transmitted so that the no-warning zone (9a) is not within range of the signal (8). Conversely, in other embodiments, the zone management unit (5) can be configured to transmit the signal (8) to the surface (6) of the floor so that only the no-warning zone (9a) is within range of the signal (8).

In other embodiments, the zone management unit (5) can be configured to transmit the signal (8) to the surface (6) of the floor so that the no-warning zone (9a), then the warning zones (9b, 9c), are successively within range of the signal (8).

Preferably, the system (1) will be configured so that the no-warning zone is as large as possible, in light of the space available for the user (4) in which his safety during his use of the virtual reality device, and in particular of the virtual reality headset (2), is not compromised. The warning zone or zones may be configured to have a ring shape surrounding the no-warning zone, providing progressive warnings to the user (in the form, for example, of an attention notification for the first warning zone and a warning notification for the second), which are not so refined that the user, receiving a notification, does not have time to react to it.

In one or more embodiments, the different zones may be defined such that the no-warning zone is a central zone, the warning zone or zones having an annular shape and extending substantially around at least a portion of the central zone, for example all around the central zone as illustrated in FIGS. 1b and 1d.

Although the zones illustrated in FIGS. 1b and 1d have inner and outer contour lines of substantially circular shape, those skilled in the art can understand that the methods and systems proposed in this application are not limited to a particular shape of the inner and outer contour lines of the no-warning and warning zones. In particular, the outer contour line of a zone may not correspond in shape to the outer contour line of the adjacent zone, making it possible to adapt to the topologies of the locations in which the methods and systems proposed in this application are implemented (private homes, trade shows, work space, etc.).

Figure 1E:
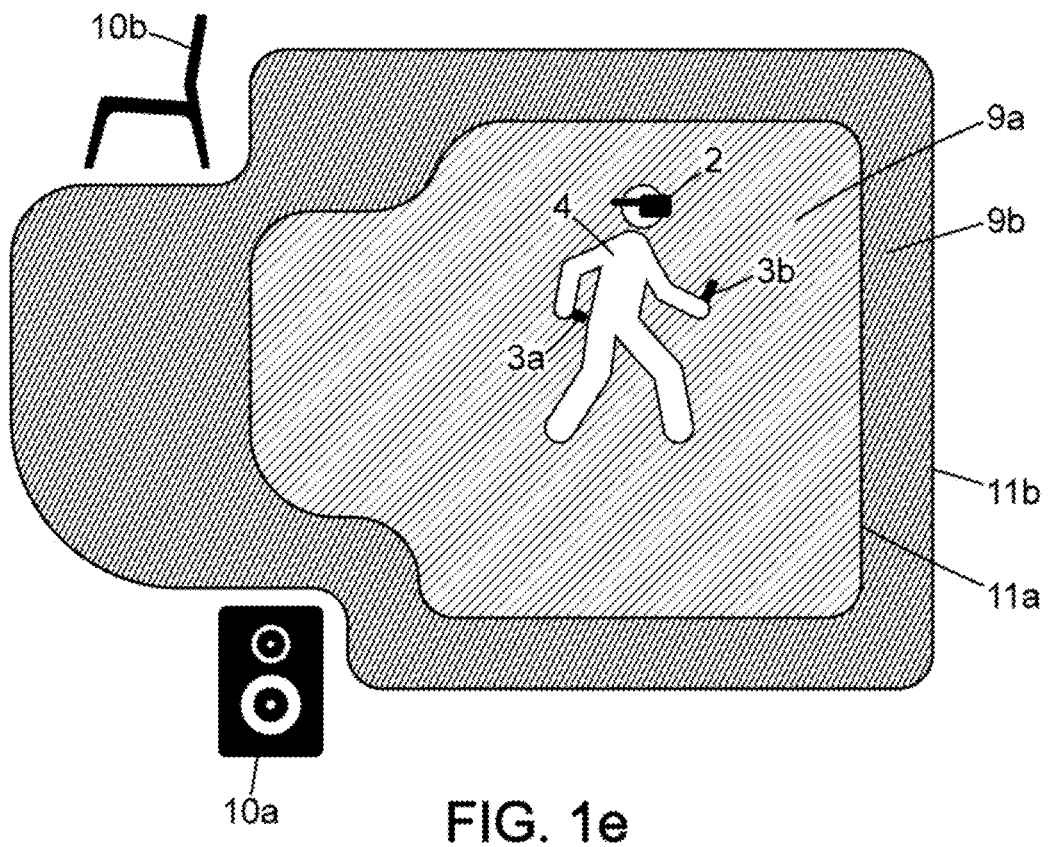
FIG. 1e shows a virtual reality system according to one or more embodiments.

As indicated above, the methods and systems proposed in this application are not limited to a particular shape of the inner and outer contour lines of the no-warning and warning zones. FIG. 1e shows an example configuration of a no-warning zone and of a warning zone in which the respective outer contour lines (11a and 11b) of the no-warning zone (9a) and of the warning zone (9b) are not substantially circular in shape, and do not match. The outer contour line (11b) of the warning zone may in particular be configured so as to avoid objects (10a, 10b) placed in the space where the user is likely to move into if he is not warned, as shown in the figure.

Figure 2A:
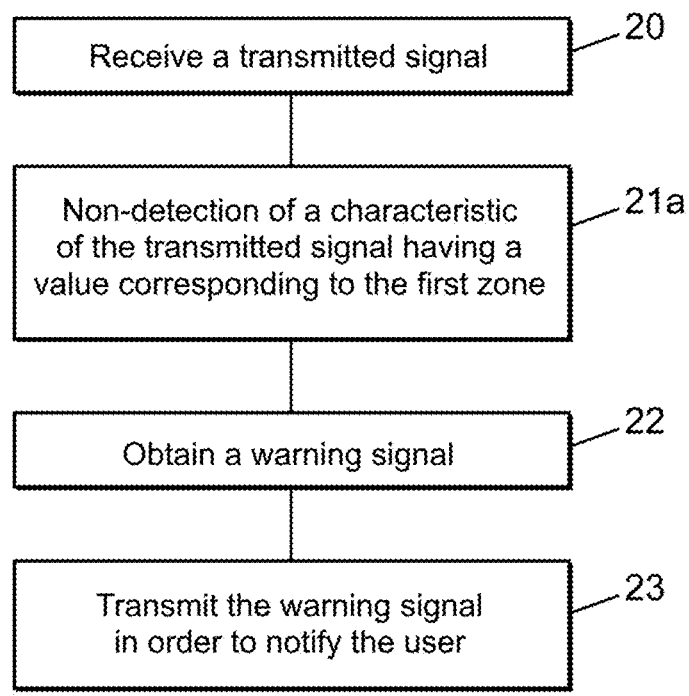
FIG. 2a is a chart illustrating the proposed method according to one or more embodiments.
Figure 2B:
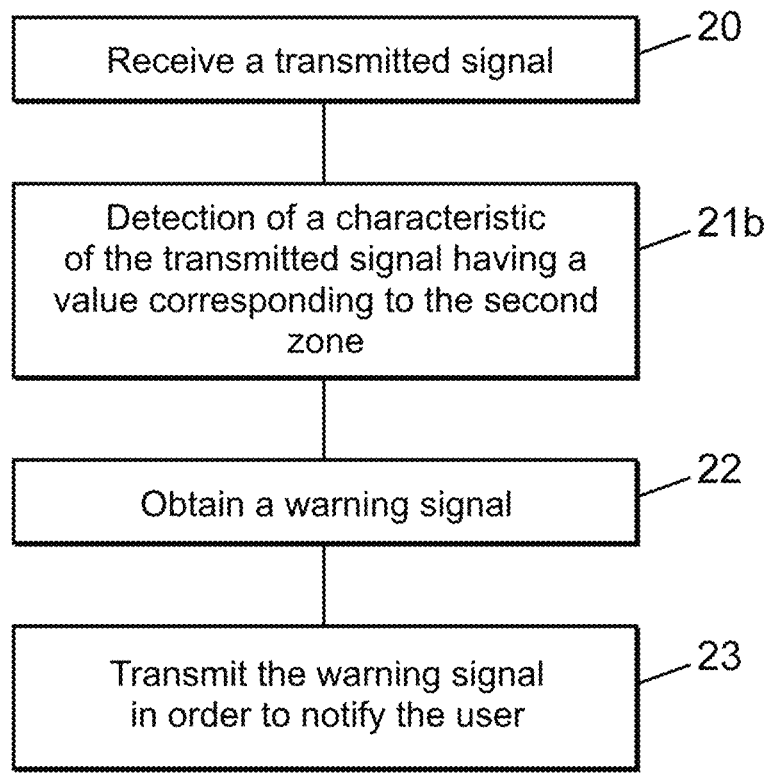
FIG. 2b is a chart illustrating the proposed method according to one or more embodiments.

FIGS. 2a and 2b are charts illustrating a proposed method according to different embodiments, implemented by a virtual reality device as proposed.

Referring to FIGS. 2a and 2b, in one or more embodiments, the proposed virtual reality device may be configured to receive (20) a wireless signal transmitted towards a surface on which a user is located, the range of the signal defining on the surface a plurality of zones comprising a first no-warning zone and a second warning zone, a characteristic relating to the transmitted signal being able to take a value (called the first value) corresponding, depending on the embodiment, to the first zone (FIG. 2a) or to the second zone (FIG. 2b). The virtual reality device can thus be configured so that a value of a characteristic relating to the transmitted signal corresponds to a zone among the first and second zones.

In one or more embodiments, this first value may correspond to, or, depending on the case, belong to a set of values of the characteristic relating to the transmitted signal, preconfigured in the system, and corresponding to a zone (for example a no-warning zone or a warning zone). This advantageously makes it possible to detect the presence of the user in a zone by means of a predefined set of values of the characteristic relating to the transmitted signal which correspond to the zone.

Several scenarios can be envisaged. In a first scenario, illustrated in FIG. 2a and corresponding to one or more embodiments, the proposed virtual reality device can be configured to receive (20) a wireless signal transmitted towards a surface on which a user is located, the range of the signal defining on the surface a plurality of zones comprising a first no-warning zone and a second warning zone, a characteristic relating to the transmitted signal being able to take a value corresponding to the first zone. The no-warning zone can thus be characterized by the fact that the range of the transmitted signal covers this zone, making it possible to characterize a warning zone by the fact that the range of the transmitted signal does not cover that warning zone.

The device can then be further configured to monitor that the received signal is the one with the characteristic having the value, and in the event of non-detection (21a) of a received signal with a characteristic having the first value (corresponding to the first zone), obtain (22) a warning signal and transmit (23) the warning signal to a control unit of the virtual reality system in order to notify a user of the virtual reality system.

In a second scenario, illustrated in FIG. 2b and corresponding to one or more embodiments, the proposed virtual reality device can be configured to receive (20) a wireless signal transmitted towards a surface on which a user is located, the range of the signal defining on the surface a plurality of zones comprising a first no-warning zone and a second warning zone, a characteristic relating to the transmitted signal being able to take a value corresponding to the second zone. Thus, a warning zone can be characterized by the fact that the range of the transmitted signal covers that zone, making it possible to characterize the no-warning zone by the fact that the range of the transmitted signal does not cover the no-warning zone.

In a third case, also illustrated in FIG. 2b and corresponding to one or more embodiments, the proposed virtual reality device can be configured to receive (20) a wireless signal transmitted towards a surface on which a user is located, the range of the signal defining on the surface a plurality of zones comprising a first no-warning zone and a second warning zone, a characteristic relating to the transmitted signal being able to take a value corresponding to the second zone (first value), and at least one other value corresponding to the first zone. Thus, a warning zone can be characterized by the fact that the range of the transmitted signal covers that zone, the characteristic of the transmitted signal then having the first value, making it possible to characterize the no-warning zone by the fact that the range of the transmitted signal also covers the no-warning zone, the characteristic of the transmitted signal then having the other value.

In a fourth scenario, also illustrated in FIG. 2b and corresponding to one or more embodiments, the proposed virtual reality device can be configured to receive (20) a wireless signal transmitted towards a surface on which a user is located, the range of the signal defining on the surface a plurality of zones comprising a first no-warning zone and a second warning zone, a characteristic relating to the transmitted signal being able to take a value corresponding to the second zone (first value), and at least one other value corresponding to another warning zone. Thus, several warning zones can be characterized by the fact that the range of the transmitted signal covers these zones, the characteristic of the transmitted signal then having a value corresponding to one of the warning zones. The no-warning zone can then be characterized, depending on the embodiment, by the fact that the range of the transmitted signal does not cover the no-warning zone, or else by the fact that the range of the transmitted signal also covers the no-warning zone, the characteristic of the transmitted signal then having a value corresponding to the no-warning zone.

In the second, third, and fourth cases mentioned above (FIG. 2b), the device can also be configured to monitor that the signal received is the one with the characteristic having the first value (corresponding to the second zone), and where appropriate to detect it (21b). Upon detection of the characteristic having the value, it may further be configured to obtain (22) a warning signal, and to transmit (23) the warning signal to a control unit of the virtual reality system in order to notify a user of the virtual reality system user.

The proposed method thus advantageously makes it possible to define at least one warning zone in order to notify the user, depending on the embodiment, when he enters this warning zone or when he is not located within the no-warning zone. The presence of the user in this warning zone or his absence from the no-warning zone is detected by means of a characteristic relating to the transmitted signal, which can take a predefined value, and in the case of detecting the presence of the user in a warning zone, associated with a warning level of which the user is to be notified. The proposed method and system thus advantageously make it possible to provide a warning to a user concerning the position of the user in relation to a no-warning zone, using only a wireless signal, in other words without wires restricting the user's movements.

In one or more embodiments, the virtual reality device may be configured to detect that the characteristic relating to the transmitted signal has the value (corresponding to the first or second zone) as soon as it detects the reception of the signal. Thus, the signal transmissions can advantageously be reduced by, depending on the embodiment, not transmitting to cover the no-warning zone and transmitting only to cover a warning zone, or conversely not transmitting to cover the warning zone and transmitting only to cover the no-warning zone.

In the embodiments where several warning zones are configured, the characteristic of the transmitted signal can be configured with several possible values respectively corresponding to the warning zones. Each warning zone is then associated with a value of the characteristic relating to the transmitted signal, so that the virtual reality device, which is configured to recognize these different values, can detect the value of the characteristic for the signal that it receives, and generate a corresponding warning signal. When the signal is transmitted with a range which covers a warning zone, it is transmitted with the characteristic taking the corresponding value.

In other embodiments, the characteristic relating to the transmitted signal can also take at least a second value, this second value corresponding to the no-warning zone when the first value corresponds to the warning zone, and the reverse: this second value corresponding to a warning zone when the first value corresponds to the no-warning zone. In this case, the transmitted signal has a range which is capable of covering the no-warning zone, and when it is transmitted with a range which covers the no-warning zone, it is transmitted with the characteristic having the corresponding value. The proposed method can then further comprise the obtaining of a no-warning signal, upon reception of the transmitted signal with the characteristic having the corresponding value.

The no-warning zone can thus be associated with a transmission of the signal, and with a value of the characteristic relating to the transmitted signal, which has the advantage of making it possible to detect, in one or more embodiments of the proposed system, that the user is indeed within the first no-warning zone. In one embodiment, the system can be configured to verify, at initialization of the virtual reality experience, that the user is indeed within the no-warning zone. In one or more embodiments, the system can be configured to generate a warning when it is detected that the user is not or is no longer within the no-warning zone. This advantageously makes it possible to confirm that he is, where appropriate, in one of the warning zones, or on the contrary to reduce the rate of false alarms when information is sent to the system indicating that the user is in a warning zone but also in the no-warning zone.

In one or more embodiments, one or more virtual reality devices usable by a user, including a virtual reality headset, are configured to work with a zone management unit which transmits a wireless signal as proposed. In particular, the virtual reality headset, and possibly other virtual reality devices, can be configured to receive the signal transmitted by the zone management unit, in order to detect that a characteristic relating to the transmitted signal has taken a first value, and upon detection that the characteristic relating to the transmitted signal has taken the first value, obtaining a warning signal and transmitting it to a control unit of the system.

In one embodiment, only the virtual reality headset, among possibly other virtual reality devices usable by the user, can be configured to implement the proposed control method. In another embodiment, another virtual reality device, for example such as a controller, can be configured to implement the proposed control method instead of or in addition to the virtual reality headset. In this case, the virtual reality device (for example the controller) can be configured to be provided with a receiver for the signal transmitted by the zone management unit, and to detect that a characteristic of the received signal has a first predetermined value, then to obtain a warning signal, either by generating it directly or by transmitting a detection signal to a management platform of the proposed system. Depending on the embodiment, the management platform function of the proposed system can be implemented within the virtual reality headset, within the zone management unit, within a remote management platform, or in a combination of two or more of these entities.

The proposed method can also be distributed over several virtual reality devices. A first device, for example a controller held in the user's hand, can be provided with the receiver for the signal transmitted by the zone management unit, and a second device, for example the helmet worn on the user's head, is provided with a display screen allowing the user to be notified of the warning.

The proposed method can thus be implemented in a centralized or distributed manner depending on the embodiment chosen.

In the distributed implementation modes, no remote management platform is used. Various functions relating to detection of the user's presence in one zone or another, and to the generation of a warning, can be implemented within one or more virtual reality devices intended to be worn by the user (virtual reality headset, controllers, etc.) which are then configured to function as a sub-system that is autonomous to the zone management unit. In these embodiments, one or more of these virtual reality devices intended to be worn by the user can then be configured to generate the warning signal, upon detection of the reception of the signal transmitted by the zone management unit with the characteristic having the first value or, depending on the embodiment, upon non-detection of the reception of the signal transmitted by the zone management unit with the characteristic having the first value, then to transmit this warning signal to the control unit of the system for user notification. This control unit may itself be implemented centrally within the virtual reality headset alone, or in a distributed manner within all virtual reality devices intended to be worn by the user. In the first case, the virtual reality device transmits the generated warning signal to the virtual reality headset, which controls the user notification function upon receiving a warning signal. In the second case, the virtual reality device can transmit the generated warning signal to a user notification unit internal to the device, and possibly transmit the warning signal to one or more other virtual reality devices carried and/or worn by the user.

In the centralized implementation modes, various functions relating to detection of the user's presence in one zone or another, and/or to the generation of a warning, can be implemented within a management platform, which may comprise the zone management unit and/or a remote management platform. The virtual reality devices intended to be carried and/or worn by the user (virtual reality headset, controllers, etc.) can then be configured to function as a subsystem controlled by the zone management unit and/or the remote platform, and to transmit a detection signal to a management platform upon detection, or depending on the embodiment upon non-detection, of the characteristic having the first value, on the basis of the received signal. The warning signal can then be generated on the basis of the reception signal by the management platform, then retransmitted to one or more of the virtual reality devices carried and/or worn by the user, for user notification on the basis of this warning signal.

In another embodiment, the implementation mode may be a combination, in other words combines a distributed implementation mode with a centralized implementation mode for implementing the functions relating to the detection of the user's presence in a zone, and/or the generation of a warning, within each entity of the proposed system.

Although the above description focuses on the warning signal, those skilled in the art will understand that it is not limited to this type of signal, and that in particular it also applies, in one or more embodiments, to a no-warning signal corresponding to the no-warning zone, as described above.

The proposed reality system can thus advantageously be configured so that a virtual reality device other than the headset, carried and/or worn by the user, can obtain a warning signal when it detects, by means of the received signal, that it is in a warning zone, and can transmit this warning signal for user notification. For example, a user wearing a headset and holding virtual reality controllers can be notified of a warning if, during a movement, one of his hands leaves the no-warning zone (in other words leaves the cone corresponding to the no-warning zone), even though his headset is still within the no-warning zone. The proposed method thus advantageously makes it possible to multiply the presence sensors within a zone that have an operation that is independent of each other.

In one or more embodiments, the transmitted signal comprises a light beam whose aperture is modulated over time, the first value and the second value respectively corresponding to a first aperture value and a second aperture value of the light beam. These first and second light beam aperture values can, in one or more embodiments, correspond to intervals of light beam aperture values preconfigured in the system, and respectively corresponding to different zones (for example a no-warning zone and a warning zone, or two zones with different warnings). This advantageously makes it possible to detect the user's presence in a zone by means of a predefined set of aperture values of the light beam corresponding to the zone.

As illustrated in FIGS. 1a and 1c, the modulation of the light beam aperture can produce the emission of a hollow cone of light of which the diameter, corresponding to the characteristic of the transmitted signal, is gradually increased over time, continuously or discretely, and according to a transmission loop for transmitting the signal in a loop between an initial position and a final position. Depending on the embodiment, the initial diameter of the light cone can correspond to the inside contour line of the warning zone closest to the no-warning zone, for example in the case where the range of the transmitted signal does not cover the no-warning zone, or at an almost zero aperture, for example in the case where the range of the transmitted signal covers the no-warning zone. The final diameter of the light cone in one embodiment may correspond to the outer contour line of the warning zone furthest from the no-warning zone.

In the case where the diameter of the hollow light cone is increased discretely, each iteration of the loop can comprise the transmission of the light signal forming a light cone having a diameter increased by a predefined increment relative to the diameter of the light cone formed by transmission of the signal during the previous iteration of the loop.

The value of the discrete increment increasing the diameter of the cone can be chosen as a function of the degree of resolution that one wishes to obtain for the definition of the zones (warning zone(s) and possibly no-warning zone).

Referring to FIGS. 1a and 1c, the zone management unit (5) may comprise, in one or more embodiments, a signal transmitter (not shown in the figure) configured to transmit a signal, a characteristic relating to the transmitted signal being able to take a first value corresponding to the first zone or to the second zone, depending on the embodiment. Different embodiments can be adopted for implementing the transmitter of the zone management unit, as illustrated by the examples of FIG. 3.

In one or more embodiments, the transmitter may comprise a light signal source, and a circular or polygonal mask placed in line with the source in order to define, on the surface on which the user is located, a range of the transmitted signal of the desired form.

In one or more embodiments, the transmitter may comprise a light beam source, with a diaphragm placed in line with it that is controlled so as to manage the aperture of a light cone as described above. In one embodiment, the diaphragm may be of the optical type providing a continuous opening, allowing the aperture of the light cone to be enlarged or reduced continuously, as illustrated in FIG. 3(c). In another embodiment, the diaphragm may be of the mechatronic type, with a barrel provided for four different positions respectively corresponding to four different cone openings (of which one corresponds to a configuration cone (9d)), which may correspond respectively to a configuration position (12d), a no-warning zone position (12a), a first warning zone position (12b), and a second warning zone position (12c), as illustrated in FIGS. 3(b) and 3(d).

Figure 3A:
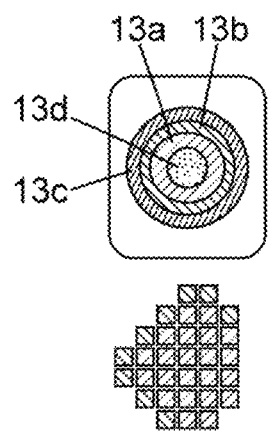
FIG. 3a shows a light signal transmitter according to one or more embodiments.

FIG. 3(a) shows an embodiment of the transmitter using a diaphragm with light emitting diodes (LED), electronically controlled to emit various light signals whose respective ranges define respective contour lines on the surface on which the user is located, as configured. FIG. 3(a) illustrates in a non-limiting manner the specific case of an LED diagram configured for four positions, which may respectively correspond to a configuration position (13d), a no-warning zone position (13a), a first warning zone position (13b), and a second warning zone position (13c). The embodiment using an electronically controlled LED panel, as shown in FIG. 3(a), advantageously makes it possible to define, by configuration of the system, contour lines of the desired shapes in order to adapt to the specific features of the space in which the user wishes to move about (available area, contour line of the available area, objects to avoid, etc.), as described above with reference to the example illustrated in FIG. 1(e).

Figure 3B:
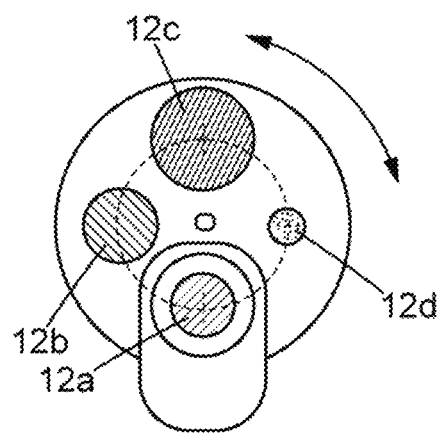
FIG. 3b shows a light signal transmitter according to one or more embodiments.
Figure 3C:
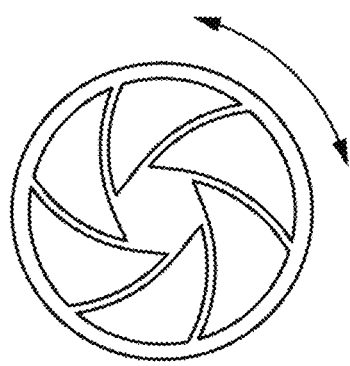
FIG. 3c shows a light signal transmitter according to one or more embodiments.
Figure 3D:
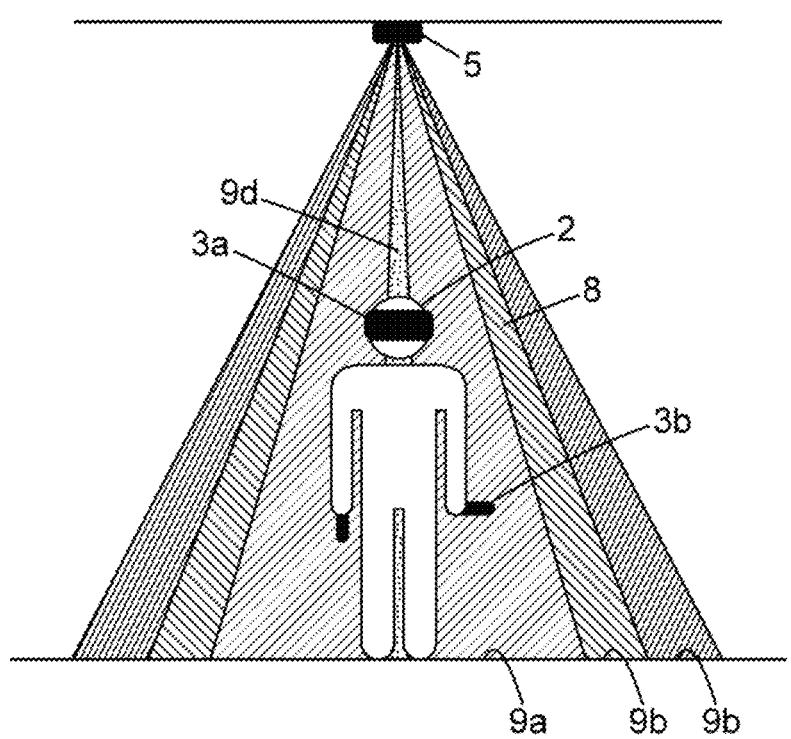
FIG. 3d shows a virtual reality system according to one or more embodiments.

The embodiments using a rotating barrel (FIG. 3(b)) or an LED mask (FIG. 3(a)) further present the advantage of allowing the configuration and use of three or four zones, with no motion or latency effects.

In one or more embodiments, the transmitter may comprise a signal source configured to transmit an ultrasonic sound shower type of signal.

In one or more embodiments, the transmitter of the zone management unit may be a light signal transmitter configured to transmit a data transmission signal by optical means, for example such as a LiFi ("Light Fidelity") type of signal. In this case, the zone management unit and at least one virtual reality device used by the user, for example such as the virtual reality headset, can be configured for data transmission by optical means, unidirectional or bidirectional depending on the embodiment, and in particular for carrying out LiFi type communications according to the IEEE 802.15.7 communication protocol.

This embodiment has the advantage of enabling the transmission of data by optical means, between the zone management unit and the virtual reality device configured for this purpose. In one or more embodiments, these data transmissions may be unidirectional, being performed from the zone management unit to one or more virtual reality devices used by the user. In other embodiments, these data transmissions may be bidirectional, and include, in addition to the downlink for data transmitted from the zone management unit to one or more virtual reality devices used by the user, an uplink in the opposite direction, meaning for data transmitted from one or more virtual reality devices used by the user to the zone management unit. The implementation of a data transmission uplink advantageously makes it possible to provide a distributed architecture for processing data relating to warnings or to the configuration of the system, it then being possible to distribute this data processing to a management platform of the system (which can be implemented, wholly or in part, within the zone management unit or within a remote platform accessible via one or more data communication networks).

The characteristic of the transmitted signal enabling detection of the zones by a virtual reality device used by the user can be of different types, depending on the embodiment.

In one or more embodiments, the transmitted signal can be modulated, and the characteristic of the transmitted signal can correspond to this modulation of the signal. For example, in one embodiment, the light modulation of a LiFi signal using variations in the light intensity of one or more LEDs makes it possible to transmit, to one or more receivers, zone identification information enabling the receiver to differentiate between preconfigured distinct zones.

Any other characteristic of the transmitted signal can be modulated so as to associate a modulation value with a characteristic value of the transmitted signal, different characteristic values or different sets of characteristic values of the transmitted signal being respectively associated with distinct zones.

In the case of a transmitted signal of the light type, the wavelength of the signal may for example be modulated in order to associate a given color with each zone to be distinguished.

In one or more embodiments, the proposed method could comprise the generation of a user notification on a user interface of a virtual reality device of the proposed system, on the basis of the warning signal or the no-warning signal. Depending on the embodiment chosen, the notification(s) presented to the user may be of different types and take different forms: visual, auditory, haptic, vibratory, etc.

Figure 4A:
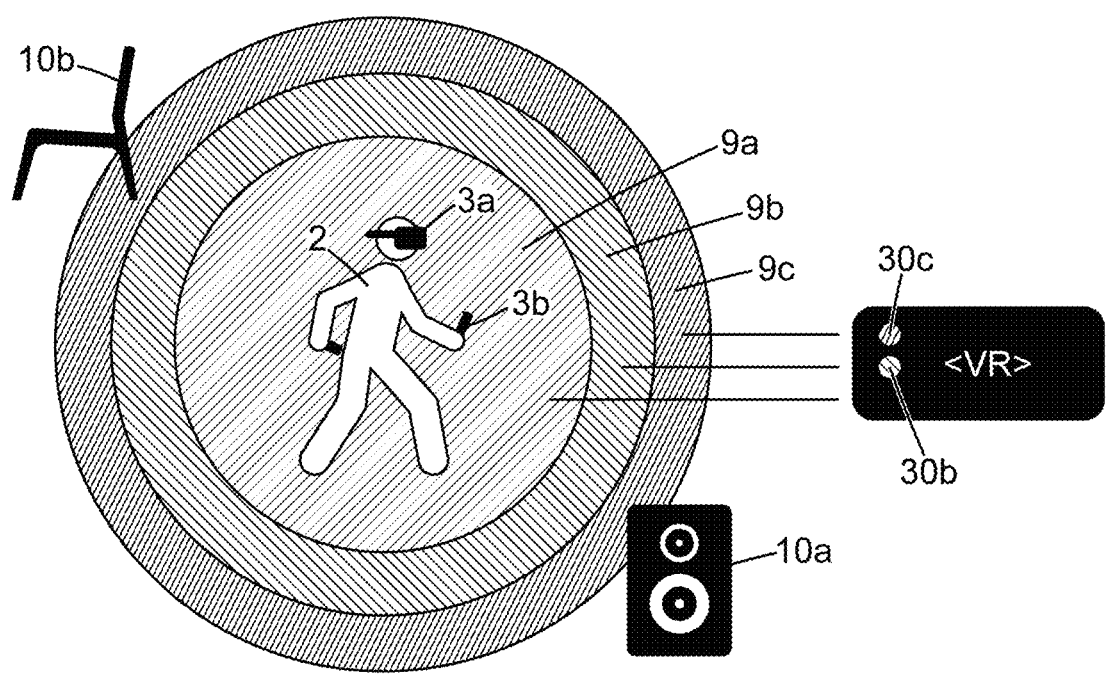
FIG. 4a shows a user notification scheme according to one or more embodiments.

In one embodiment, the proposed virtual reality system may be configured to directly integrate these notifications into the virtual reality experience, for example via software libraries ("Software Development Kit" or SDK), in order to advantageously include them in a contextual, transparent, and immersive manner. FIG. 4a illustrates such a warning overlay scheme, with a point (30c) being superimposed at the top left of the screen displaying the virtual reality content, in order to notify the user visually of a presence warning in the second warning zone (9c), a point (30b) being superimposed in the middle left of the screen displaying the virtual reality content, to notify the user visually of a presence warning in the first warning zone (9b), or no point being superimposed on the screen displaying the virtual reality content, to notify the user visually of a presence in the no-warning zone (9a).

Figure 4B:
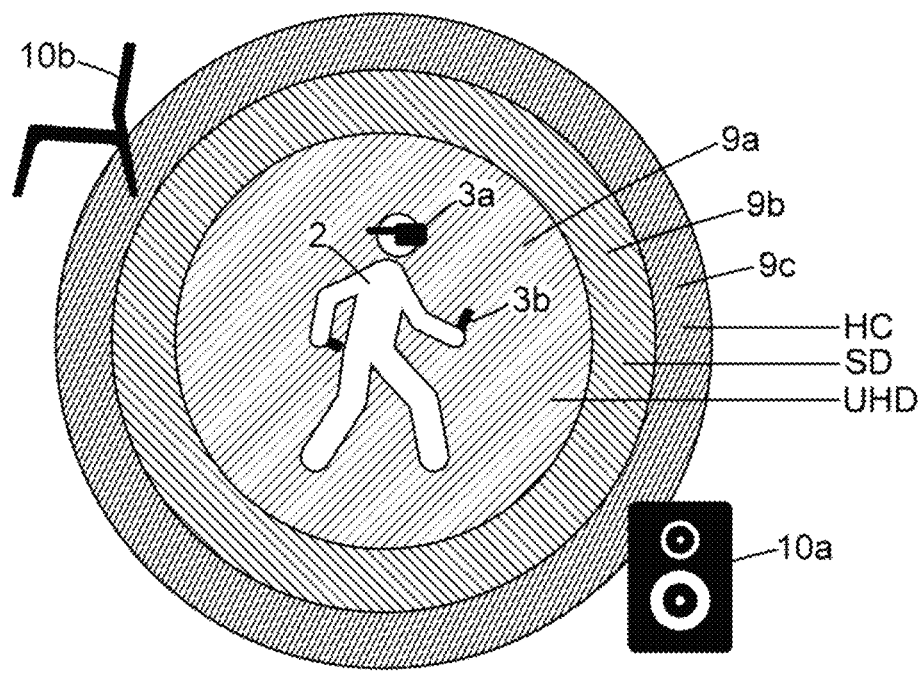
FIG. 4b shows a user notification scheme according to one or more embodiments.

In one embodiment, the user notification may be achieved by modifying the virtual reality content presented to the user, which has the advantage of presenting a notification which remains implicit and subtle, while not requiring the resources of the virtual reality device(s) worn by the user to present notifications in other forms. For example, the user notification may use a modulation of the quality of the reception and/or display of the stream of virtual reality content, as a function of the presence detection in one of the predefined zones. As illustrated in FIG. 4b, the quality of the video stream supplied to the virtual reality devices worn by the user, and in particular the screen of his virtual reality headset, can be modulated to be Ultra High Definition (UHD) when the presence of the user is detected in the no-alarm zone (9a), or when the presence of the user is not detected in an alarm zone (9b, 9c), at a standard definition level (SD), which is lower than the UHD level, when the presence of the user is detected in the first alarm zone (9b), and the video stream can be interrupted (HC for "Offline") when the presence of the user is detected in the first alarm zone (9c).

In one embodiment, the proposed virtual reality system may be configured so that in the event of leaving a zone, the notification is accompanied by a visual and/or audio reproduction of what is happening in the room, in order to eliminate doubt for example, and decide whether to continue or stop the VR experience if necessary. In one embodiment, a camera and/or a microphone can be added to the virtual reality headset or on the ceiling in order to reproduce the external environment without the user removing the headset.

In one or more embodiments, the initial configuration of the proposed system, which makes it possible to define the zones as well as the associated user notifications, will be carried out during a system configuration phase prior to its use. This configuration phase may use a configuration signal, such as the one (9d) illustrated in FIG. 3, in order to distinguish the configuration phase from a phase of normal use of the system once configured. In one embodiment, the user can configure the system by triggering a configuration phase (initiating a configuration phase at each virtual reality device and possibly, depending on the embodiment, at a management platform of the system implemented, wholly or in part, within the zone management unit), then moving about within the space to successively teach the system the contour lines of the various zones (warning and no-warning), possibly after having carried out a recognition of the boundary of the surface area located within the range of the wireless signal transmitted by the zone management unit.

In one embodiment, the proposed system is further configured to perform detection of unwanted entries (for example of a person, an object, or an animal) in one of the zones managed by the system (no-warning zone and warning zone(s)). In one embodiment, this detection of unwanted entries can be implemented using an infrared detector with which the zone management unit can be provided. The zone management unit can thus further comprise an infrared detector configured to detect an unwanted entry into one of the zones managed by the system, an unwanted entry corresponding to the presence in one of the managed zones of a person other than the user, an object (for example a ball which rolls to one of the zones), or an animal, in each case not located within a zone during configuration of the system.

Figure 5A:
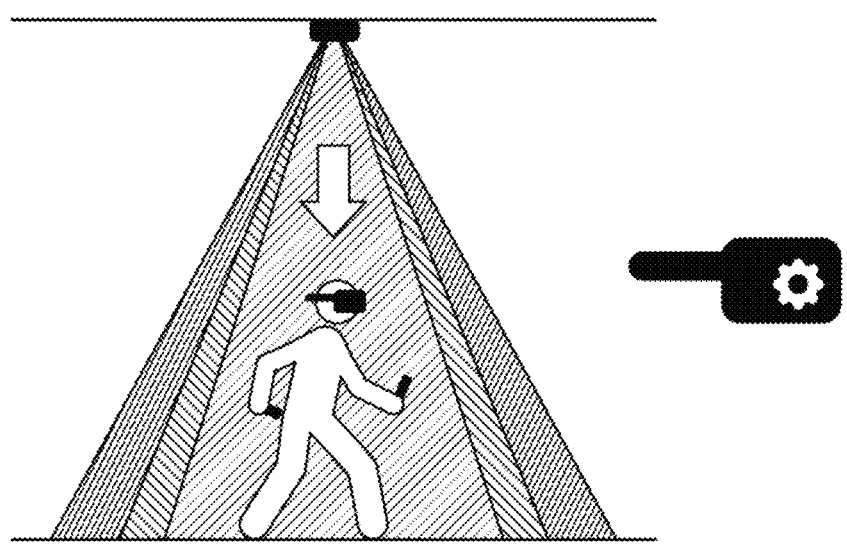
FIG. 5a shows a virtual reality system according to one or more embodiments.

In one embodiment, illustrated in FIG. 5a, the user will be able to use a virtual reality headset autonomously, in the sense that the virtual reality content is embedded in a memory of the headset. In this case, the perimeter of use can advantageously be made safe by means of an infrared cone or some other technology, with a transmitter on the ceiling as the apex and one or more receivers on the virtual reality headset, wristbands, or controllers, or even integrated into a floor mat. In this case, the configuration of the proposed system could be stored in memory within a virtual reality device, for example such as the virtual reality headset.

Figure 5B:
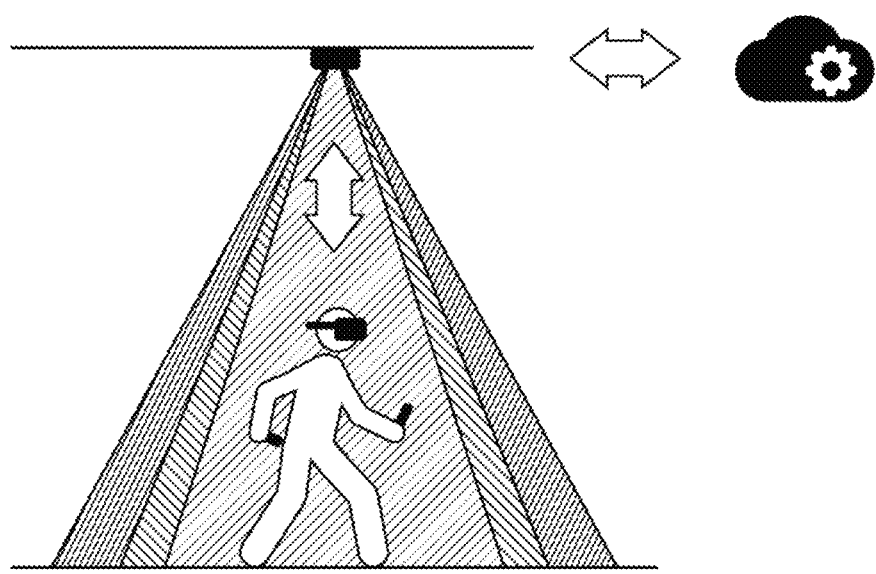
FIG. 5b shows a virtual reality system according to one or more embodiments.

In another embodiment, illustrated in FIG. 5b, the user will be able to use a virtual reality headset in controlled operation, in the sense that the virtual reality content is hosted by a remote server, accessible via one or more data communication networks. In this case, the perimeter of use safe can advantageously be made safe by means of a broadcasting cone with bidirectional interaction, as described above, with a transmitter/receiver as its apex (for example of the LiFi type), and transmitters/receivers in the virtual reality headset and/or virtual reality wristbands or controllers. In this case, the configuration of the proposed system can be stored in memory on the remote server.

The proposed method advantageously makes it possible, including in the two cases described above, to detect zone entries/exits and to warn the user in an appropriate manner. Zone entry occurs, for example, when a third party, an animal, or an object is too close to the user. Once any doubt has been eliminated, resumption can take place by means of a voice assistant, thus avoiding removal of the hardware or an additional configuration.

In a more elaborate embodiment, the zone monitoring device can be duplicated in order to manage the space stereoscopically and thus identify the spatial orientation of the user: to provide better warning of crossing predefined zones but potentially also to better adapt the VR content, in a totally immersive manner.

Figure 6:
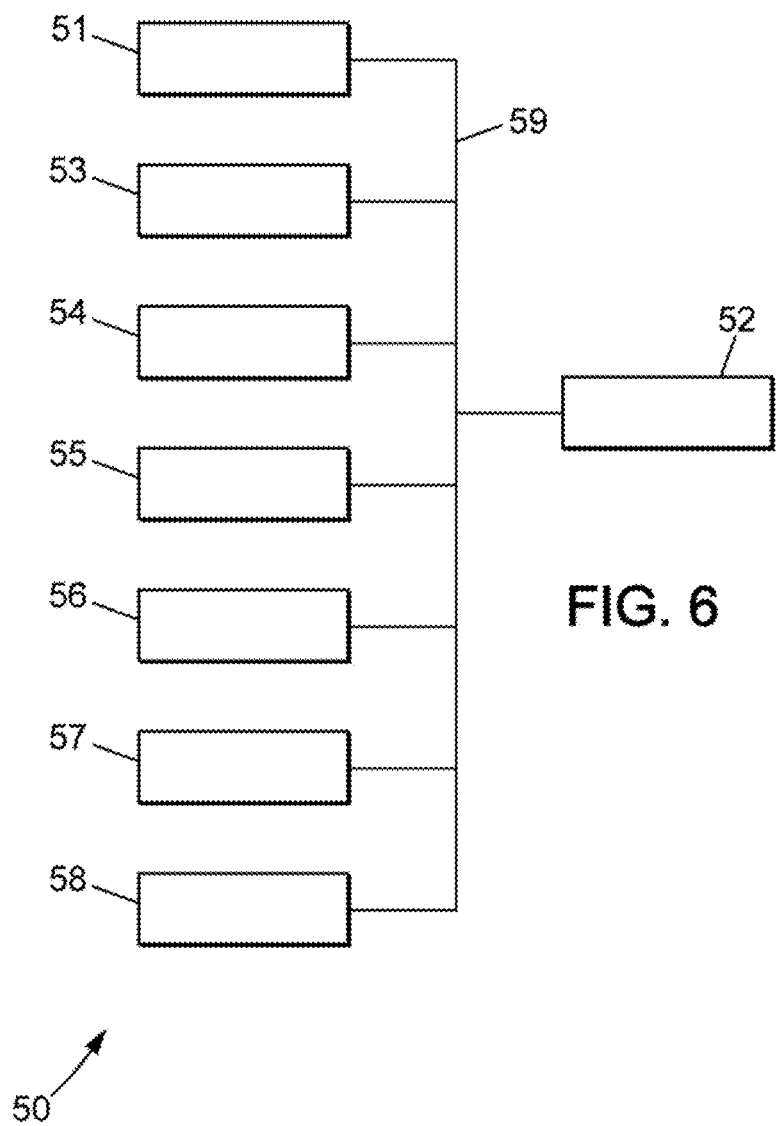
FIG. 6 illustrates an architecture of a virtual reality device according to one or more embodiments.

FIG. 6 shows an example of the architecture of a virtual reality device according to one or more embodiments.

With reference to FIG. 6, in one or more embodiments, the virtual reality device (50) (for example a virtual reality headset, a controller, or a wristband) may comprise a wireless communication unit (51), a controller (52), a power supply unit (53), a virtual reality unit (54), a zone warning management unit (55), a user notification management unit (56), a user interface (HMI) (57), and a memory (58). Depending on the embodiment, the wireless communication unit (51), the power supply unit (53), the virtual reality unit (54), the zone warning management unit (55), the user notification management unit (56), the user interface (HMI) (57), and the memory (58) could be operatively coupled to the controller (52) by a communication bus (59) or by any communication link, possibly comprising one or more hardware connectors. In the architecture of the device (50) illustrated in FIG. 6, the assembly of wireless communication units (51), controller (52), power supply unit (53), virtual reality unit (54), zone warning management unit (55), user notification management unit (56), user interface (HMI) (57), memory (58), and communication bus (59) form a virtual reality device according to one or more embodiments, which may also include other components, units, and/or functions not shown in the figure.

The controller (52) may include one or more processors, such as a microprocessor, microcontroller, or other hardware processor, associated memory (for example random access memory (RAM), cache memory, flash memory, etc.), and be able to be configured to control the wireless communication unit (51), the power supply unit (53), the virtual reality unit (54), the zone warning management unit (55), the user notification management unit (56), the user interface (HMI) (57), and the memory (58), in order to control the use of the device (50) according to one or more embodiments of the proposed method, for example by executing a computer program comprising portions of code for implementing a control method as proposed in this application. Depending on the embodiment, a memory associated with the controller (52), external or internal to the controller (52), contains instructions which, when executed by the controller (52), cause that controller (52) to perform or control the parts of the wireless communication unit (51), power supply unit (53), virtual reality unit (54), zone warning management unit (55), user notification management unit (56), user interface (HMI) (57), and memory (58) of the examples of implementing the proposed method described in this application. The controller (52) may be a component implementing a processor or a computing unit for the command of a virtual reality system according to the proposed method and the control of the wireless communication unit (51), power supply unit (53), virtual reality unit (54), zone warning management unit (55), user notification management unit (56), user interface (HMI) (57), and memory (58) of the device (50), for example such as a microcontroller.

The zone warning management unit (55) and the user notification management unit (56) may be implemented, depending on the embodiment chosen, in the form of one or more software items, or of a combination of one or more hardware items and one or more software items, configured to implement embodiments of the control method described in this application. In particular, the virtual reality device (50) may be configured via the zone warning management unit (55) to obtain, upon detection of the characteristic of a received signal having a second predefined value, a warning signal, depending on the embodiment by generating this warning signal or by obtaining it from another virtual reality device, from a zone management unit transmitting the signal, or from a remote management platform, according to one or more embodiments described in this application. The virtual reality device (50) may be configured via the user notification management unit (56) to transmit a warning signal to a control unit of the system which may be, depending on the embodiment, integrated into the device (50), distributed in a plurality of virtual reality devices (including the device (50)), and/or integrated into a remote management platform, in order to notify a user of the virtual reality system into which the device (50) is integrated, according to one or more embodiments described in this application.

The software part of the zone warning management unit (55) and/or of the user notification management unit (56) may constitute or form part of driver software for the device (50)

The wireless communication unit (51) may be implemented, depending on the embodiment chosen, in the form of a combination of one or more hardware items and one or more software items, and may include, depending on the embodiment chosen, one or more radiofrequency and/or optical communication devices, and driver software for a communication unit, for example executable by the controller (52), or in another architecture of the device, executable by a processor of the wireless communication unit (51), and loaded into a memory accessible by a processor configured to execute the driver software for the communication unit. In one or more embodiments, the wireless communication unit (51) may comprise a data communication interface.

For example, the wireless communication unit (51) may be configured to use communication links such as "Bluetooth", "Bluetooth Low Energy" (BLE), "Bluetooth Smart", WiFi, or any communication link based on the IEEE802.11x protocols, "Zigbee" and/or any communication link based on the IEEE802.15.4 protocols, "Z-Wave", "6LowPAN" (IPv6 Low-power wireless Personal Area Network), "Thread", "Sigfox", "Neul", "LoRa", and/or based on the specifications developed by the 3GPP group for "LTE-M" networks, any near field communication type of link (NFC), and/or any optical data communication link, in particular based on the IEEE802.15.7 protocols, for example such as any "LiFi" type of communication link, in unidirectional or bidirectional mode, depending on the case.

The power supply unit (53) may be implemented, depending on the embodiment chosen, in the form of a combination of one or more hardware items and one or more software items, and may comprise one or more electrical power supplies, such as one or more batteries, and power supply driver software, for example executable by the controller (52), or, in another architecture of the device, executable by a processor of the power supply unit (53), and loaded into a memory accessible by a processor configured to execute the power supply driver software.

The virtual reality device (50) may be implemented in the form of software, in which case it takes the form of a program executable by a processor, in the form of hardware, or in the form of a combination of hardware and software elements.

Depending on the embodiment, different architectures of the device (50) may be adopted, both for the hardware part of the device and for the software part of the device, where applicable.

Those skilled in the art will understand that the proposed method is not limited to a particular architecture of the virtual reality device (50), wireless communication unit (51), controller (52), power supply unit (53), virtual reality unit (54), zone warning management unit (55), user notification management unit (56), user interface (HMI) (57), memory (58), and communication bus (59), or of the coupling between these elements illustrating an embodiment in FIG. 6 by way of example.

Depending on the embodiment chosen, certain acts, actions, events, or functions of each of the methods described in this document may be carried out or take place in a different order than that in which they have been described, or may be added, merged, or not be carried out or not take place, depending on the case. Furthermore, in some embodiments, certain acts, actions, or events are carried out or take place concurrently and not sequentially.

Although described through a number of detailed exemplary embodiments, the proposed control method and the device for implementing an embodiment of the method include various variants, modifications, and improvements which will become apparent to those skilled in the art, it being understood that these various variants, modifications, and improvements are within the scope of the present disclosure as defined by the claims which follow. In addition, various aspects and features described above may be implemented together or separately, or may be substituted for one another, and all of the various combinations and sub-combinations of the aspects and features are within the scope of the present disclosure. In addition, it may be that some systems and devices described above do not incorporate all of the modules and functions described for the preferred embodiments.

The invention claimed is:

1. A method for controlling a warning system comprising a user device, the method comprising, in the warning system:
receiving a wireless signal transmitted towards a surface on which a user is located, the wireless signal having a range that defines, on the surface, a plurality of zones comprising a no-warning first zone and a warning second zone, a characteristic relating to the transmitted signal being able to take a value corresponding to the first zone or to the second zone, called a first value;
upon detection of the characteristic having the first value when the first value corresponds to the second zone, or upon non-detection of the characteristic having the first value when the first value corresponds to the first zone, obtaining a warning signal, and
transmitting the warning signal to a control unit of the warning system in order to notify a user of the system.

2. The method according to claim 1, wherein the characteristic relating to the transmitted signal can also take a second value, the second value corresponding to the first zone when the first value corresponds to the second zone, or to the second zone when the first value corresponds to the first zone.

3. The method according to claim 2, wherein the transmitted signal comprises a light beam of which the aperture is modulated over time, the first and the second values respectively corresponding to at least one first value and at least one second value for the aperture of the light beam.

4. The method according to claim 3, wherein the light beam transmits an optical data transmission signal, for example of the Light Fidelity type.

5. The method according to claim 2, further comprising: generating the warning signal upon detection of the reception of the transmitted signal with the characteristic having the value corresponding to the second zone.

6. The method according to claim 1, further comprising: upon detection of the reception of the transmitted signal with the characteristic having the value corresponding to the second zone, transmitting a detection signal to a system management platform, and receiving the warning signal.

7. The method according to claim 2, further comprising: upon reception of the transmitted signal with the characteristic having the value corresponding to the first zone, obtaining a no-warning signal.

8. The method according to claim 1, further comprising: on a user interface of the user device of the warning system, generating a user notification on the basis of the warning signal.

9. The method according to claim 1, further comprising: receiving a message of unwanted entry into one of the plurality of zones, and generating a user notification on the basis of the message of unwanted entry.

10. The method according to claim 1, further comprising: configuring the system by learning the zones of the plurality of zones.

11. The method according to claim 1, further comprising: notifying the user of the warning signal from the system, by modifying a virtualized reality content presented to the user.

12. A warning system comprising:
a user device comprising a processor and a wireless communication receiver that is operatively coupled to the processor, the processor being configured to:
receive a wireless signal transmitted towards a surface on which a user is located, the wireless signal having a range that defines, on the surface, a plurality of zones comprising a no-warning first zone and a warning second zone, a characteristic relating to the transmitted signal being able to take a value corresponding to the first zone or to the second zone, called the first value;
upon detection of the characteristic having the first value when the first value corresponds to the second zone, or upon non-detection of the characteristic having the first value when the first value corresponds to the first zone, obtain a warning signal, and
transmit the warning signal to a control unit of the warning system in order to notify a user of the system.

13. A non-transitory storage medium for a computer-executable program, comprising a set of data representing one or more programs, said one or more programs comprising instructions which, when said one or more programs is executed by a computer comprising a processing unit operatively coupled to a memory and to an input/output interface module, cause the computer to implement a method for controlling a warning system comprising a user device, the method comprising, in the warning system:
receiving a wireless signal transmitted towards a surface on which a user is located, the wireless signal having a range that defines, on the surface, a plurality of zones comprising a no-warning first zone and a warning second zone, a characteristic relating to the transmitted signal being able to take a value corresponding to the first zone or to the second zone, called the first value;

upon detection of the characteristic having the first value when the first value corresponds to the second zone, or upon non-detection of the characteristic having the first value when the first value corresponds to the first zone, obtaining a warning signal, and transmitting the warning signal to a control unit of the warning system in order to notify a user of the system.

14. The warning system according to claim 12, wherein the characteristic relating to the transmitted signal can also take a second value, the second value corresponding to the first zone when the first value corresponds to the second zone, or to the second zone when the first value corresponds to the first zone.

15. The warning system according to claim 14, wherein the processor is further configured to: generate the warning signal upon detection of the reception of the transmitted signal with the characteristic having the value corresponding to the second zone.

16. The warning system according to claim 12, wherein the processor is further configured to: upon detection of the reception of the transmitted signal with the characteristic having the value corresponding to the second zone, transmit a detection signal to a system management platform, and receive the warning signal.

17. The warning system according to claim 14, wherein the processor is further configured to: upon reception of the transmitted signal with the characteristic having the value corresponding to the first zone, obtain a no-warning signal.

18. The warning system according to claim 12, wherein the processor is further configured to: on a user interface of the user device of the warning system, generate a user notification on the basis of the warning signal.

19. The warning system according to claim 12, wherein the processor is further configured to: receive a message of unwanted entry into one of the plurality of zones, and generate a user notification on the basis of the message of unwanted entry.

20. The non-transitory storage medium according to claim 13, wherein the characteristic relating to the transmitted signal can also take a second value, the second value corresponding to the first zone when the first value corresponds to the second zone, or to the second zone when the first value corresponds to the first zone.

21. The non-transitory storage medium according to claim 13, wherein the method further comprises: generating the warning signal upon detection of the reception of the transmitted signal with the characteristic having the value corresponding to the second zone.

* * * * *